Patented May 8, 1934

1,957,547

UNITED STATES PATENT OFFICE 1,957,547

IMPROVED DIBENZANTHRONE AND PROCESS FOR ITS MANUFACTURE

Ralph Norbert Lulek, Milwaukee, Wis., assignor to E. I. du Pont de Nemours & Company, Wilmington, Del., a corporation of Delaware No Drawing. Application March 10, 1932, Serial No. 598,091

8 Claims. (Cl. 260—61)

This invention relates to chemical compounds and more particularly to substances useful as vat dyes and vat dye intermediates. It especially relates to derivatives of oxidized dibenzanthrone.

The synthetic dyestuff industry is approximately seventy-five years old having been initiated by Perkin's discovery of Mauveine in 1856. During the life of this industry research has been carried out on a most extensive scale and progress has been very rapid and wide spread. The field is now so broad as to practically preclude any one person being a specialist in more than one phase of the industry. The expansion of the industry has been greatly aided by its literature accumulation which is now most extremely voluminous. This is well shown by the list of the United States dye patents which was published at the end of 1923 by Doyle. This list is a book comprising approximately 600 pages. Although certain natural vat dyes were known before Perkin's discovery above referred to, the developments in this field have been particularly prominent since the discovery of Indanthrone in 1901 by Bohn. In spite of the great age of this industry, the extensive research and literature accumulation, there has been but one green anthraquinone commercially successful vat dye produced. This dye is commercially known as Ponsol green G (C. I. 1101) and is produced by the acylation or alkylation (U. S. P. 1,531,261) of the oxidation and mild reduction (U. S. P. 1,093,427) product (hereinafter referred to as di-hydroxy-dibenzanthrone) of dibenzanthrone. This invention particularly deals with new processes for the preparation of Ponsol green G.

This invention has for an object the production of new chemical compounds and processes and in general an advancement in the art. Other objects will appear hereinafter.

These objects are accomplished by isolating the alkali metal salt of oxidized and mildly reduced dibenzanthrone, and if desired further treating the isolated alkali metal compound to produce a dye of the Ponsol green G type previously referred to. This further treatment may involve acylation, alkylation or analogous treatment of the isolated alkali metal compound or it may involve treatment of the isolated alkali metal compound with acid and subsequent acylation, alkylation or analogous treatment of the acid treated product. The invention will be further understood from a consideration of the following examples in which the parts are given by weight.

Example I

Ten (10) parts of the dry oxidation product of dibenzanthrone prepared according to U. S. P. 1,093,427 by the oxidation of dibenzanthrone with manganese dioxide and boric acid in concentrated sulphuric acid which had been treated with sodium bisulphite to remove the manganese dioxide were heated with 200 parts of fused sodium sulphide with good agitation at 130–160° C. for 3 hours. The melt was then boiled for 15 minutes with 1500 parts of water, filtered, washed with water and alcohol and dried. The greenish-black powder obtained is believed to be the sodium salt of di-hydroxy-dibenzanthrone since it contained by analysis 8.3% of sodium and would have contained according to theory 8.6%. The product is soluble in concentrated sulphuric acid with a violet color and in hot water and pyridine with a green color. It gives blue alkaline hydrosulphite vats from which cotton is dyed in bright yellow-green shades. When the mildly reduced oxidation product prepared according to U. S. P. 1,093,-427 is similarly treated the same product results.

Example II

Ten (10) parts of di-hydroxy-dibenzanthrone were heated to boil with a solution of 100 parts of sodium sulphide in 300 parts of water. After boiling for one hour the mass was filtered, washed with salt water and dried. The compound produced was apparently identical with that obtained in Example I.

The oxidized but not mildly reduced product of U. S. P. 1,093,427 may be similarly treated.

It is to be understood that the invention is not limited to the production of the sodium salt of dihydroxy-dibenzanthrone. If desired the potassium or other alkali metal salts may be prepared and utilized.

Throughout the specification and claims the term "alkali metal salt" is used to include the ammonium (NH$_4$–) salts which are similar in their reactions to the alkali metal compound. Other alkali metal sulphides or poly-sulphides than those of sodium may be used in the process described.

If desired the treatment of the dibenzanthrone derivative with aqueous alkali metal sulphides (or poly-sulphides) may be carried out in autoclaves at temperatures exceeding the boiling point of the solution.

By treating the alkali metal salts produced according to the above examples with dilute mineral acids, for example, hydrochloric acid, free di-hydroxy-dibenzanthrone which is a dark blue powder, is produced.

The invention herein described has numerous advantages over the art as exemplified in the patents previously mentioned. The dyeings made with the alkali metal salts of the di-hydroxy-dibenzanthrone are brighter and generally superior to those produced by the product of U. S. P. 1,093,427. The same is true of the dyeings made with the di-hydroxy-dibenzanthrone produced from the alkali metal salt products of this invention.

The alkali metal compounds produced according to this invention are very reactive, and may be acylated or alkylated (for example, methylated with di-methyl-sulphate) with great ease. The resultant products give dyeings which are superior to the dyeings made from the products of U. S. P. 1,531,261. Generally superior dyeings are also produced from the acylated or alkylated di-hydroxy-dibenzanthrones produced in accordance with the above.

As many apparently widely different embodiments of this invention may be made without departing from the spirit and scope thereof, it is to be understood that I do not limit myself to the specific embodiments thereof except as defined in the appended claims.

I claim:

1. A process for producing alkali metal salts of dihydroxy-dibenzanthrone which comprises treating oxidized and mildly reduced dibenzanthrone with an alkali metal sulfide or poly-sulfide, and separating the alkali metal salt from the reaction mass.

2. A process for producing the sodium salt of dihydroxy-dibenzanthrone which comprises treating oxidized and mildly reduced dibenzanthrone with sodium sulfide or poly-sulfide, and separating the sodium salt from the reaction mass.

3. A process for producing the sodium salt of dihydroxy-dibenzanthrone which comprises treating oxidized and mildly reduced dibenzanthrone with sodium sulfide and separating the sodium salt from the reaction mass.

4. A process for preparing dihydroxy-dibenzanthrone which comprises treating oxidized and mildly reduced dibenzanthrone with an alkali metal sulfide or poly-sulfide, separating the resulting alkali metal salt of dihydroxy-dibenzanthrone and treating it with an acid to form dihydroxy-dibenzanthrone.

5. A process for preparing dihydroxy-dibenzanthrone which comprises treating oxidized and mildly reduced dibenzanthrone with an alkali metal sulfide or poly-sulphide, separating the resulting alkali metal salt of dihydroxy-dibenzanthrone and treating it with a dilute acid solution to form dihydroxy-dibenzanthrone.

6. A process for preparing dihydroxy-dibenzanthrone which comprises treating oxidized and mildly reduced dibenzanthrone with sodium sulfide, separating the resulting sodium salt of dihydroxy-dibenzanthrone and treating it with a dilute mineral acid solution to form dihydroxy-dibenzanthrone.

7. A process for preparing alkali metal salts of dihydroxy-dibenzanthrone which comprises treating dihydroxy-dibenzanthrone with a member selected from the group consisting of an alkali metal sulfide and an alkali metal poly-sulfide.

8. A process for preparing the sodium salt of dihydroxy-dibenzanthrone which comprises treating dihydroxy-dibenzanthrone with sodium sulfide.

RALPH N. LULEK.